United States Patent [19]

Sarma

[11] Patent Number: 5,126,865
[45] Date of Patent: Jun. 30, 1992

[54] LIQUID CRYSTAL DISPLAY WITH SUB-PIXELS

[75] Inventor: Kalluri R. Sarma, Mesa, Ariz.

[73] Assignee: Honeywell Inc., Minneapolis, Minn.

[21] Appl. No.: 636,534

[22] Filed: Dec. 31, 1990

[51] Int. Cl.[5] .......................................... G02F 1/1343
[52] U.S. Cl. ........................................ 359/59; 359/87; 340/784
[58] Field of Search ................... 350/333, 336, 339 R, 350/331 R; 359/59, 87; 340/784

[56] References Cited

U.S. PATENT DOCUMENTS

| | | | |
|---|---|---|---|
| 4,840,460 | 6/1989 | Bernot et al. | 359/59 X |
| 4,983,022 | 1/1991 | Shannon | 350/333 |
| 5,033,823 | 7/1991 | Shannon | 350/333 |

OTHER PUBLICATIONS

"Active-Matrix LCDs Using Gray-Scale in Halftone Methods," by K. Sarma et al., published in SID International Symposium, dated May 1989.

Primary Examiner—Stanley D. Miller
Assistant Examiner—Ron Trile
Attorney, Agent, or Firm—John G. Shudy, Jr.

[57] ABSTRACT

A half-tone pixel having subpixels and control capacitor constituting a 100 percent optically active pixel. The subpixel design results in no reductions in the maximum pixel aperture ratio, brightness or contrast, as a pixel with no subpixels would have. Various subpixel layouts including differing numbers of subpixels and subpixel-turn-on sequences may be implemented and still result in the entire pixel being optically active.

8 Claims, 8 Drawing Sheets

SECTION V

ELECTRICAL EQUIVALENT

SECTION VI

SECTION VII

ELECTRICAL EQUIVALENT

--- LAYER 1 (ITO)
▨ VIA IN LAYER 2 (DIELECTRIC)
— LAYER 3 (ITO)

LIQUID CRYSTAL DISPLAY WITH SUB-PIXELS

FIELD OF THE INVENTION

The present invention pertains to displays, and particularly, to liquid crystal displays (LCD's). More particularly, the invention pertains to active matrix LCD's having half tone gray scales and high pixel aperture ratios.

BACKGROUND OF THE INVENTION

LCD technology is being developed as a possible successor to cathode rate (CRT) technology for many applications. LCD technology offers important advantages, such as higher reliability and reduced power, size and weight. However, in the current state of development, LCD image rendering capability falls short of that achievable from the use of CRT's. The present invention addresses one of the major technical obstacles which involves viewing angle and brightness limitations associated with LCD's when they are operated in a gray scale mode.

SUMMARY OF THE INVENTION

The invention implements a half-tone gray scale in the active matrix liquid crystal display (AMLCD). As an example of the related art, gray scale display technology incorporates four subpixels. There is space between the subpixels which is inactive and thus reduces the pixel aperture ratio. In the gray scale or half tone pixel of the present invention, the entire pixel is optically active due to the control capacitor array design of the invention. The invention may incorporate a half tone pixel with subpixels having uniform cell spacing or a half tone pixel having concentric subpixels of different sizes.

DESCRIPTION OF THE PREFERRED EMBODIMENTS

Figure 1:
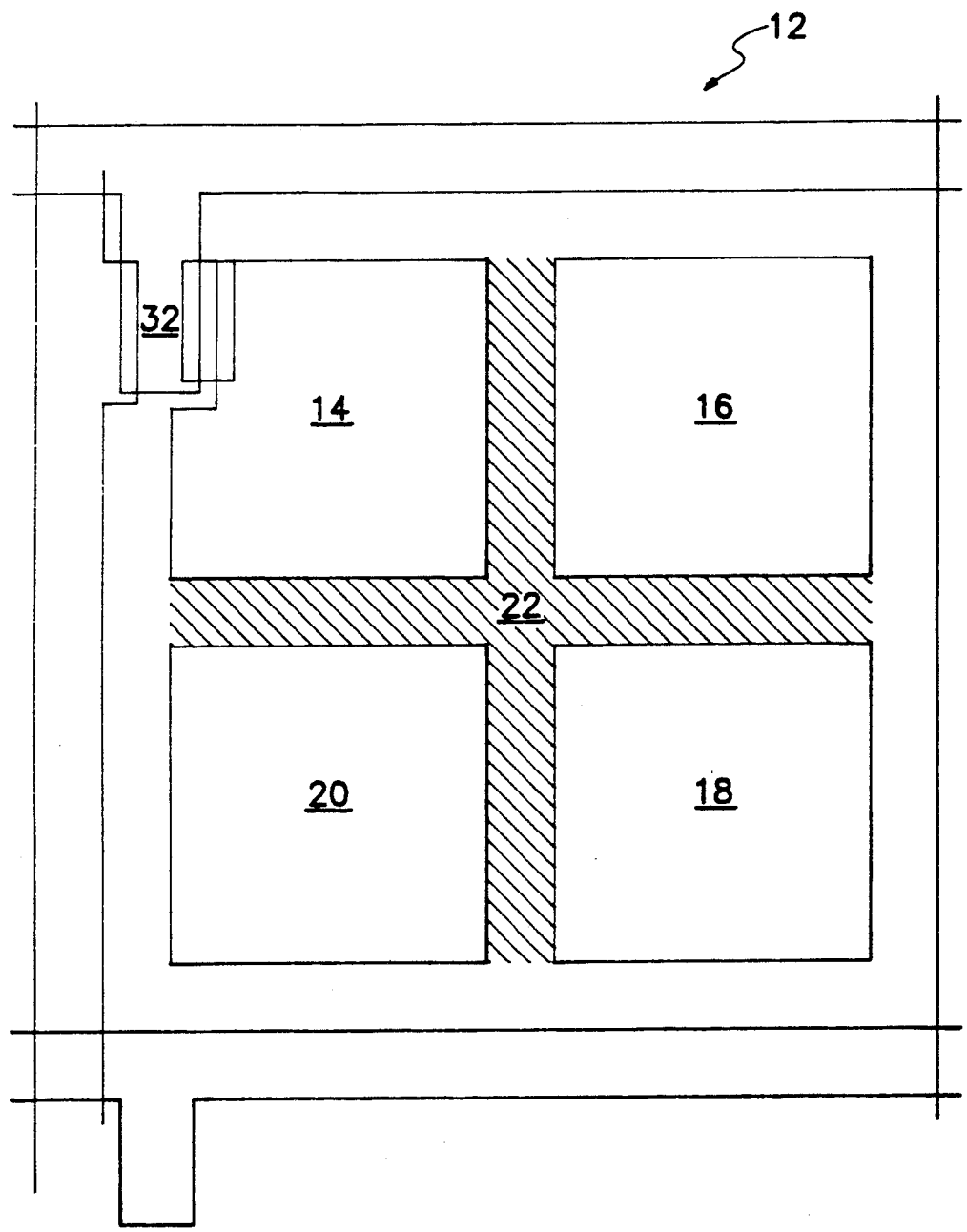
FIG. 1 shows a layout of a half-tone pixel according to the related art.
Figure 2A:
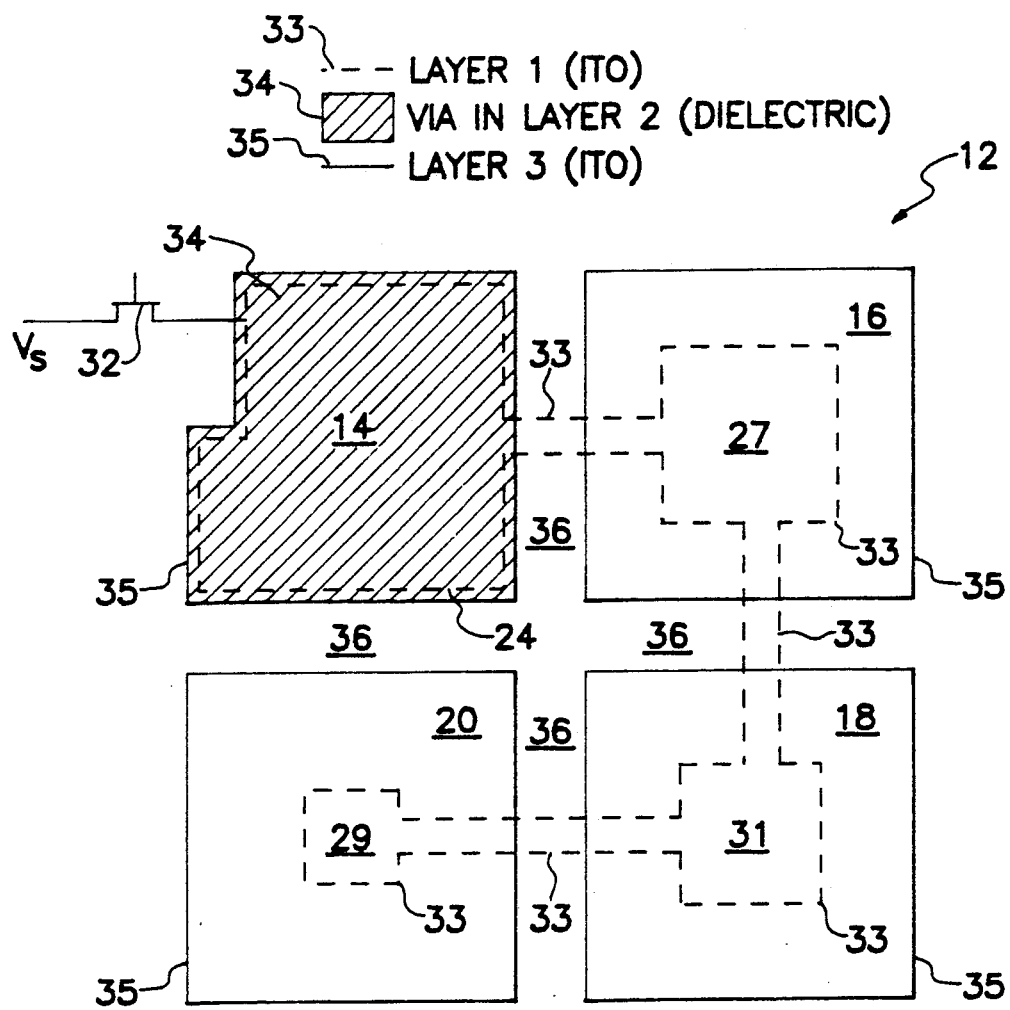
FIGS. 2a and 2b show a layout and the electrical equivalence of the related art half-tone pixel.
Figure 2B:
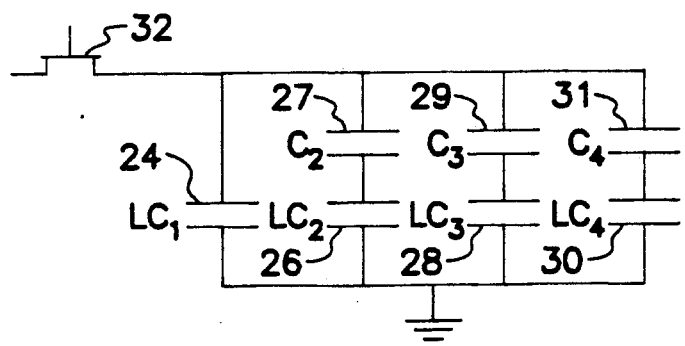

The present invention incorporates a half-tone approach to the active matrix liquid crystal displays, which is based on the fact that the liquid crystal electro-optic response is essentially independent of the viewing angle when it is operated in a bi-level mode, i.e., either fully on or fully off. A control capacitor approach has been developed to achieve the half-tone gray scale. Such approach involves subdividing the pixel into a number of subpixels, and incorporating a control capacitor in series with each subpixel. FIG. 1 shows a layout of a half-tone pixel 12 having four subpixels 14, 16, 18 and 20. Space 22, which is the shaded area between subpixels 14, 16, 18 and 20, is inactive and thus reduces the pixel aperture ratio. FIG. 2a reveals greater detail of the construction of the half-tone pixel of FIG. 1. FIG. 2b is a schematic of the electrical equivalent of the pixel illustrated in FIG. 2a. Control capacitors 27, 29 and 31 act as voltage dividers and serve to control the voltage across the liquid crystal subpixels 14, 16, 18 and 20 thereby controlling the number of subpixels that turn on as the source voltage (Vs) of thin film transistor (TFT) 32 is changed to vary the overall gray level of pixel 12. One or more subpixels are either totally on or off. The control capacitor values are determined s that at the most only one subpixel is at a voltage between the threshold and saturation voltages of the liquid crystal to minimize the gray scale errors at off-normal viewing angles. This approach improves the viewing angle behavior of the AMLCD's.

Control capacitors 27, 29 and 31 are fabricated either on the active matrix substrate or on the common electrode substrate. The capacitance for each of the control capacitors 27, 29 and 31 is determined according to the area for each of the electrodes of these capacitors. A first layer of indium tin oxide (ITO) 33 which is a transparent and conducting oxide defines the area of control capacitors 27, 29 and 31. A dielectric film having a controlled thickness, such as silicon nitride or silicon dioxide, serves as the control capacitor dielectric. There is a via 34 in the dielectric so as to eliminate a control capacitor for subpixel 14. A second layer of ITO provides the electrodes of subpixels 14, 16, 18 and 20. Capacitors 24, 26, 28 and 30 represent the incidental liquid crystal display capacitances of subpixels 14, 16, 18 and 20, respectively. Control capacitors 27, 29 and 31 are in series with display capacitances 26, 28 and 30, respectively.

A significant problem of the above-mentioned approach is the reduction of pixel aperture ratio (pixel luminance) which reduces the maximum brightness and contrast achievable in the liquid crystal display. Pixel aperture ratio is the sum of the active subpixel areas divided by the total pixel area incorporating the subpixels. The reduction of pixel aperture ratio is due to space 36 between or among subpixels 14, 16, 18 and 20, not being optically active. To increase the aperture ratio, space 36 among the subpixels 14, 16, 18 and 20, is reduced. However, product yield considerations prevent the minimizing of intra-subpixel spacing 36 and thus reducing the aperture ratio loss to satisfactory levels. Further, optically inactive space 36 mandates the use of either a dark matrix between or among subpixels 14, 16, 18 and 20 or a normally dark mode of the AMLCD operation having parallel polarizers. The use of the dark matrix between subpixels 14, 16, 18 and 20, increases the complexity of fabrication of a color filter ray circuit due to the reduction in feature sizes. Alternatively, a lack of normally white mode of the AMLCD panel operation reduces design flexibility and makes optimization for improved image quality impractical. The present invention incorporating a new half-tone pixel design eliminates these deficiencies and obstacles.

Figure 3:
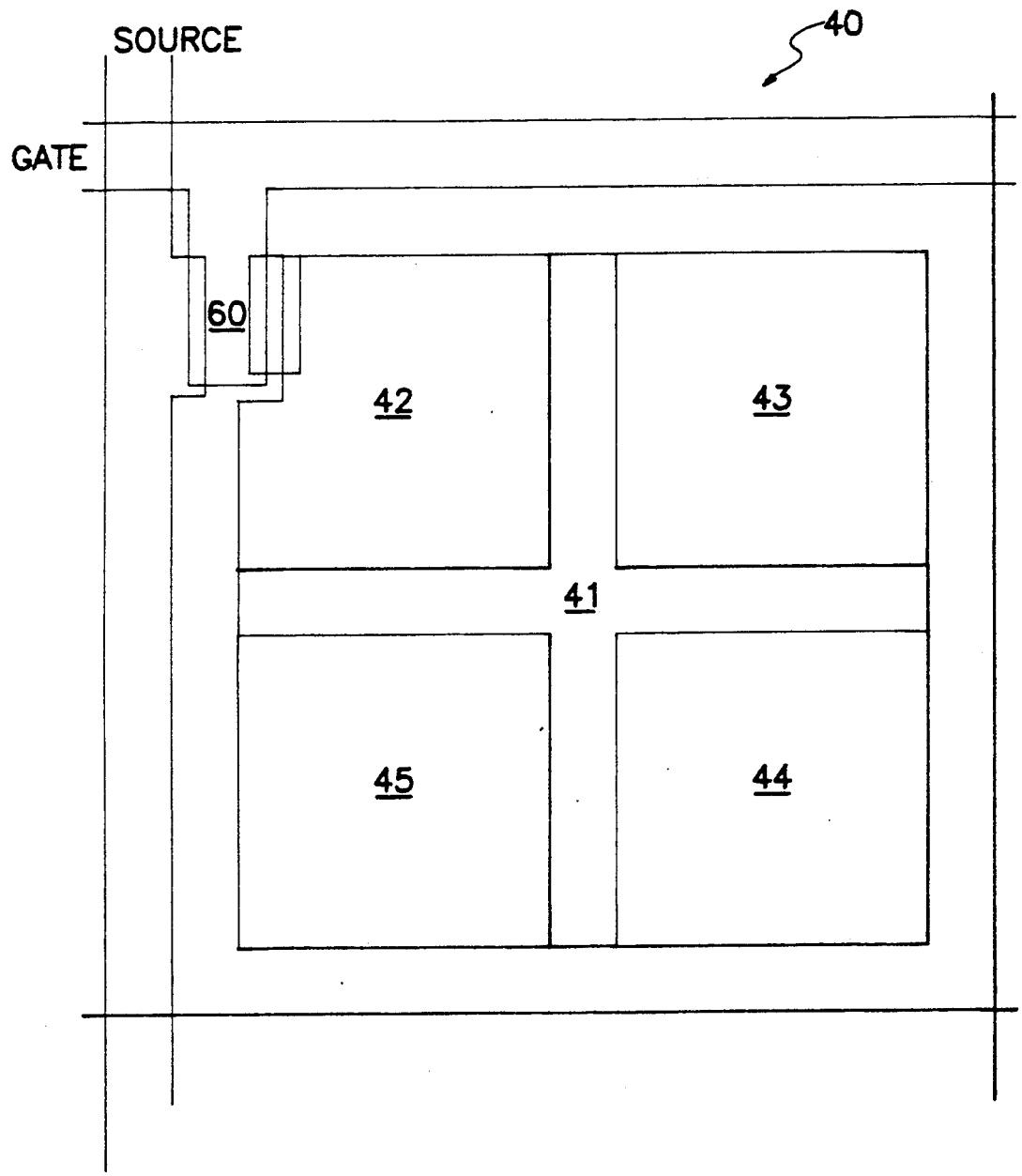
FIG. 3 shows a half-tone pixel according to the invention.
Figure 4A:
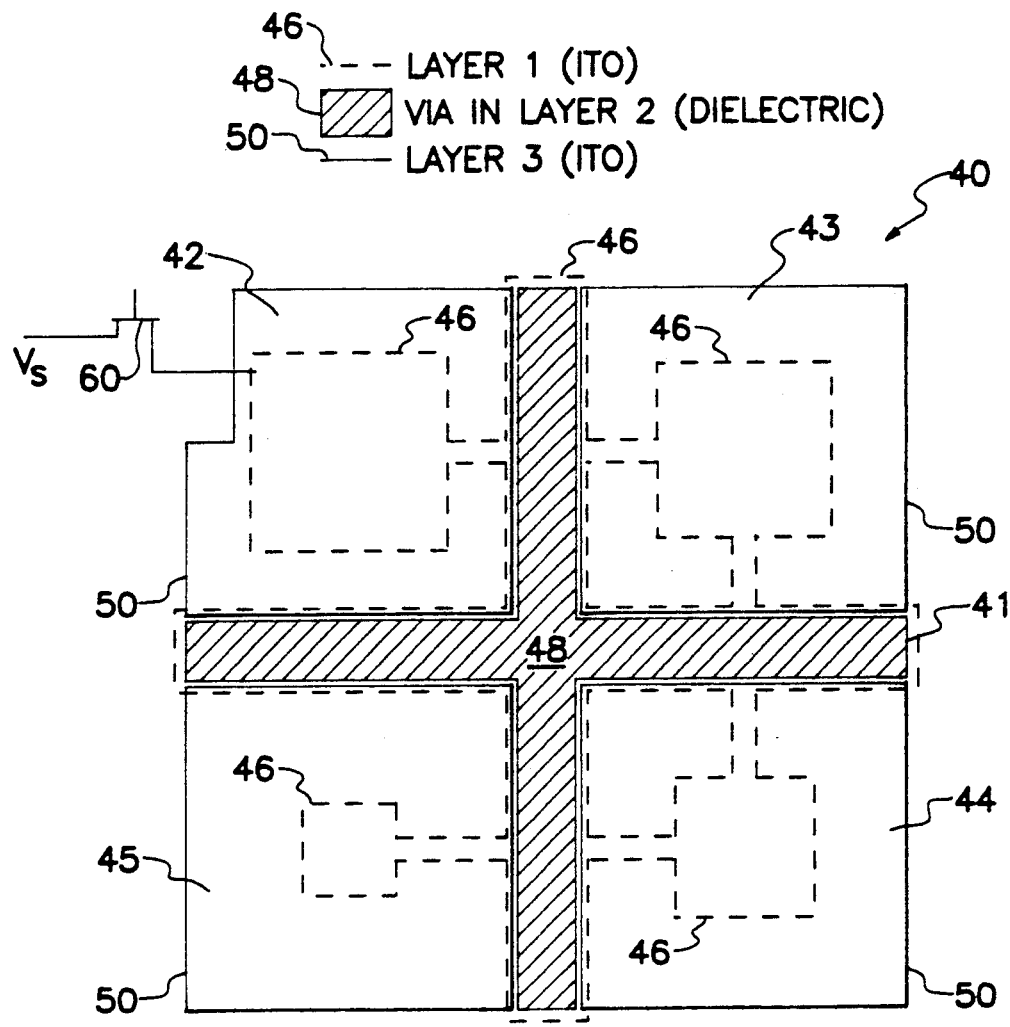
FIGS. 4a and 4b reveal a layout and the electrical equivalent of the half-tone pixel of the invention.
Figure 4B:
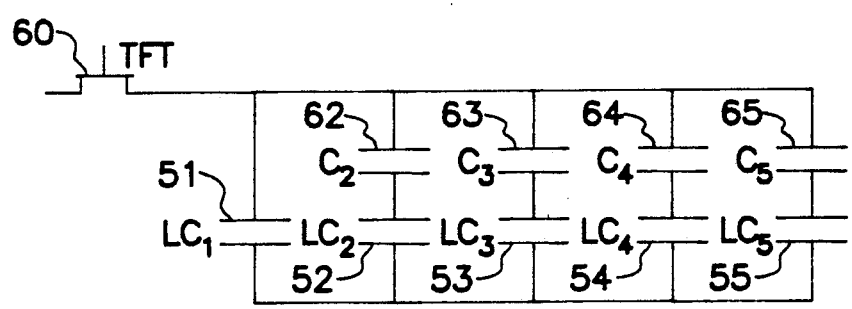

FIG. 3 shows a drawing of a half-tone pixel array according to the invention, having subpixels 41, 42, 43, 44 and 45. FIG. 4a shows more detail of half tone pixel 40 of FIG. 3. FIG. 4b is a schematic of the electrical equivalent of half-tone pixel 40 of FIG. 4a. First ITO layer 46 defines areas for control capacitors 62, 63, 64 and 65. Layer 48 represents the capacitor dielectric. Second ITO layer 50 defines the regions of subpixels 42, 43, 44 and 45. In addition to defining the control capacitor areas, the first ITO layer 46 defines the area of subpixel 41 which is the space between subpixels 42, 43, 44 and 45. Cross-hatched area 48 represents a via and serves to remove the series control capacitor for subpixel 41. Because ITO layers 46 and 50 are separated by dielectric layer 48, layers 46 and 50 can have a slight overlap as shown in FIG. 4a. Thus, in this design, there are no restrictions with respect to minimum subpixel spacing due to photolithographic processes, as in related art designs. The fabrication sequence of the control capacitor array of FIG. 4 is: 1) deposit, pattern and etch first ITO layer 46, 2) deposit control capacitor dielectric 48, 3) deposit, pattern and etch second ITO layer 50, and 4) pattern and etch a via in dielectric 48 to define subpixel 41.

The design of half-tone pixel 40 results in 100 percent of the pixel being optically active. As a result, such design allows implementation of half-tone gray scale using a control capacitor approach with no reductions in the maximum pixel aperture ratio, brightness, and contrast.

A feature of the half-tone pixel 40 design of FIGS. 4a and 4b is that the layout of layers 46, 48 and 50 are such that subpixel 41, having no series control capacitor, is positioned at the intra-subpixel region.

Even though FIGS. 3, 4a and 4b show five subpixels, any number of subpixels may be utilized with the present invention. Since entire pixel 40 is optically active, there is additional flexibility for various subpixel layouts and subpixel turn-on sequences for desired image quality.

Figure 5B:
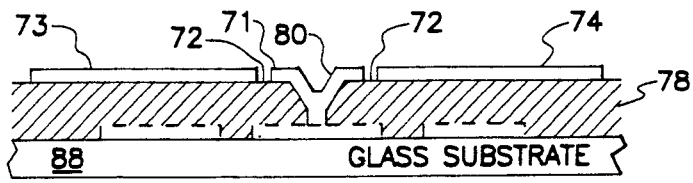
FIGS. 5a, 5b and 5c show a layout of the half tone pixel for uniform cell spacing.
Figure 5A:
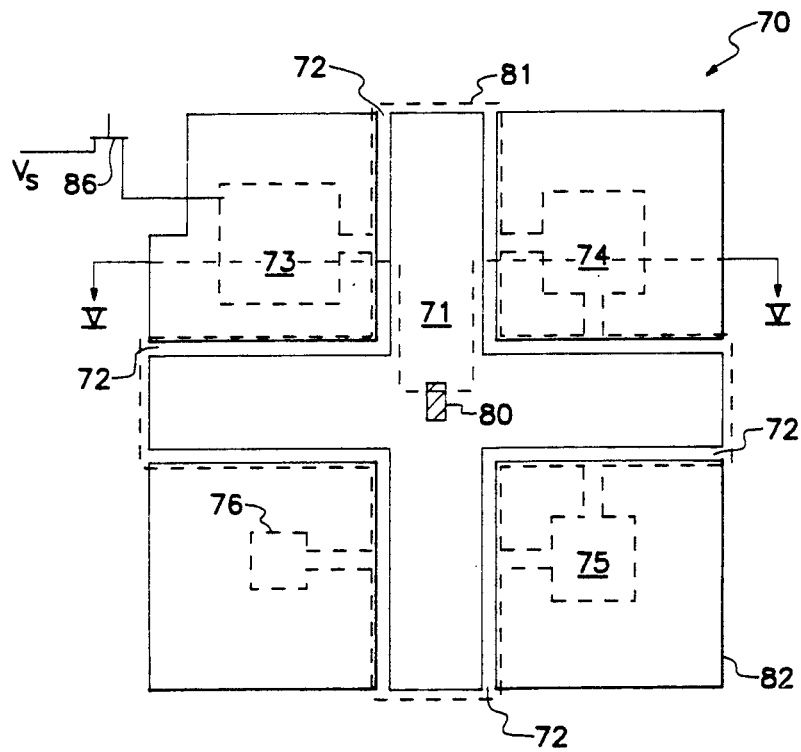
Figure 5C:
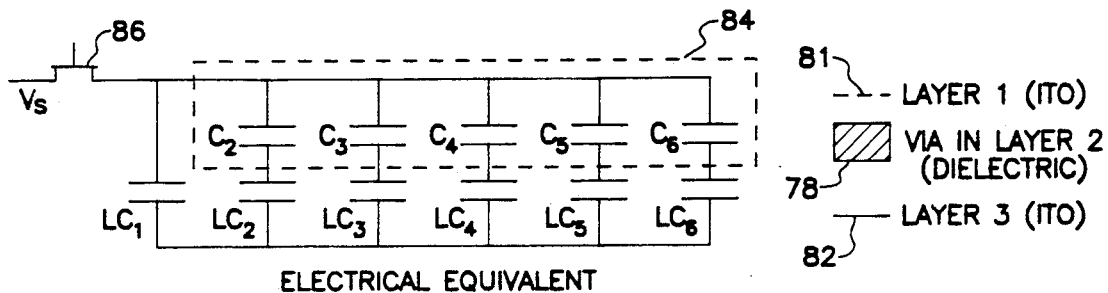

FIGS. 5a, 5b and 5c reveal another layout of a halftone pixel 70. FIG. 5a shows a six subpixel design having subpixels 71, 72, 73, 74, 75 and 76. Layer 78 is continuous throughout the pixel except for a small contact via 80 at the subpixel 71 region as illustrated in FIGS. 5a and 5b. The continuity of layer 78 permits the entire liquid crystal cell or pixel 70 except for the small contact via region 80, to be maintained at the Gooch-Tarry minimum cell spacing, for maximum contrast. Gooch and Tarry derived an optimum value for liquid crystal cell spacing that would result in the best off-state and thus at a maximum contrast. Layers 81 and 82 of ITO are revealed in FIG. 5a. The layout of layers 81, 78 and 82 are such that subpixel 71, whose area is defined by ITO layer 81, is positioned at the intra-subpixel region.

Figure 6A:
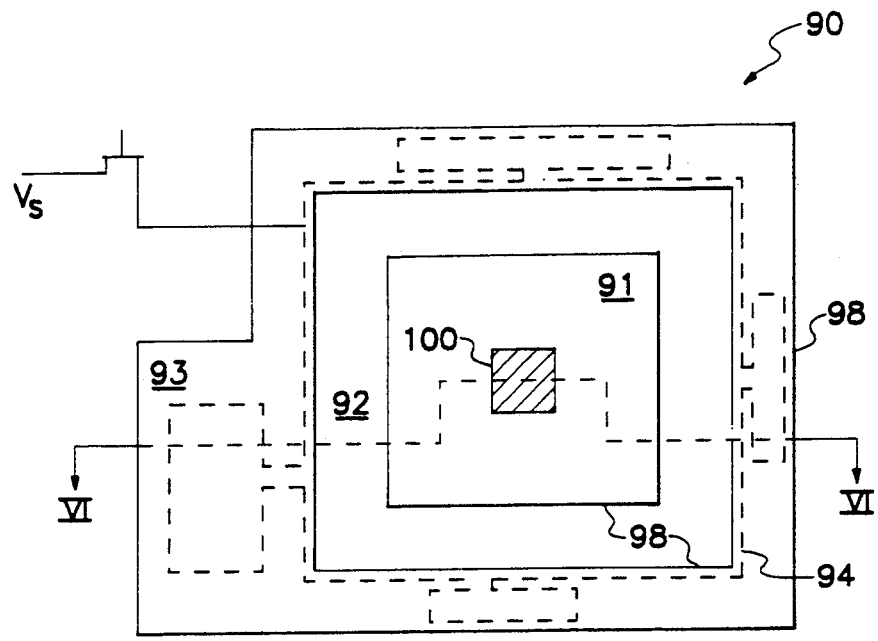
FIGS. 6a, 6b and 6c reveal a layout of a half tone pixel having three concentric subpixels.
Figure 6B:
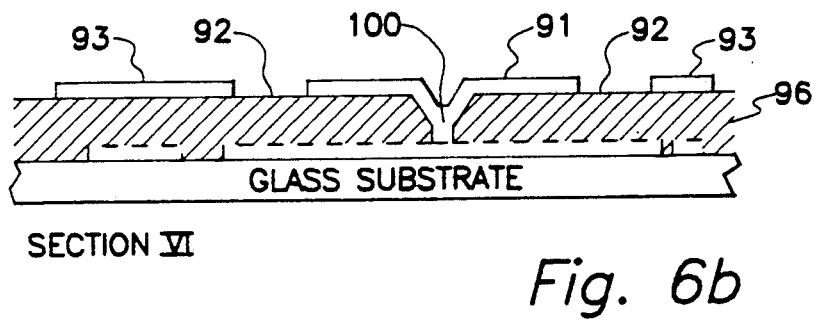
Figure 6C:
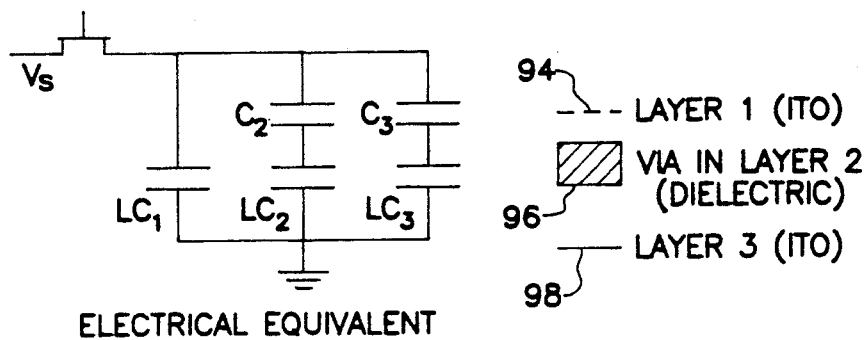

FIGS. 6a, 6b and 6c show the layout of a half-tone pixel 90 having three concentric subpixels 91, 92 and 93. FIG. 6c shows the electrical equivalent of pixel 90. Layer 96 is continuous in pixel 90 except for small contact via region 100. ITO layers 94 and 98 delineate the control capacitor and subpixel areas, respectively.

Figure 7A:
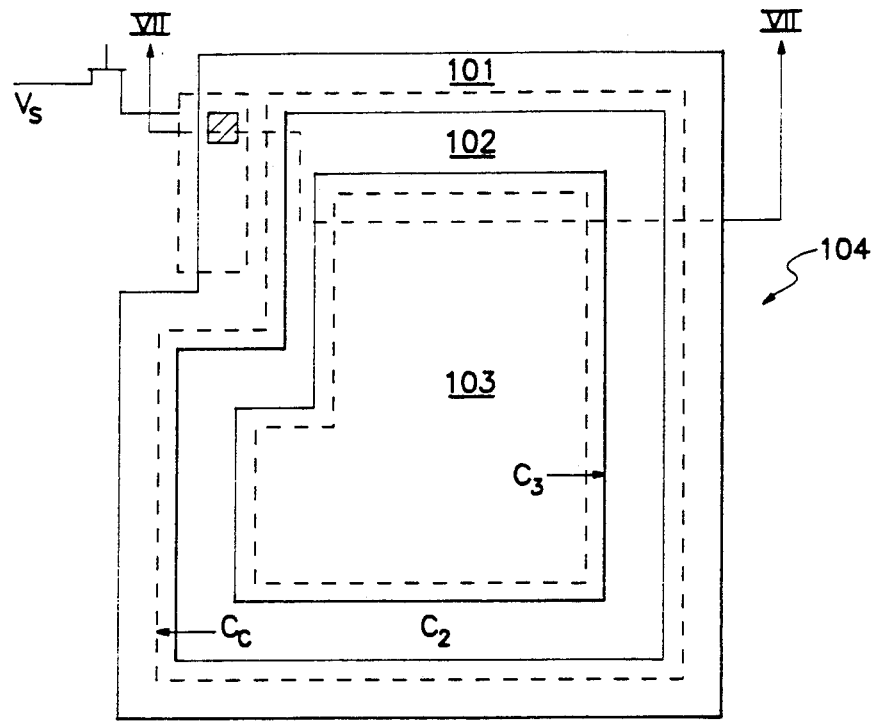
FIG. 7a, 7b and 7c show a layout of a concentric-type half tone pixel having a coupling capacitor.
Figure 7B:
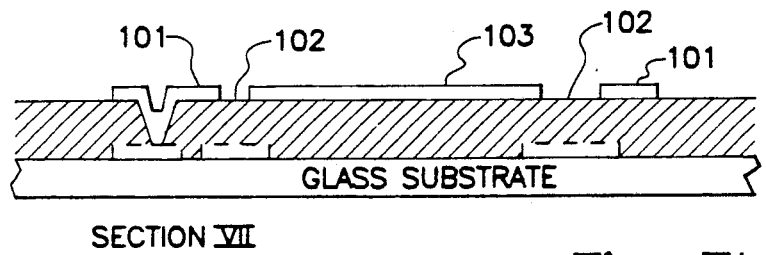
Figure 7C:
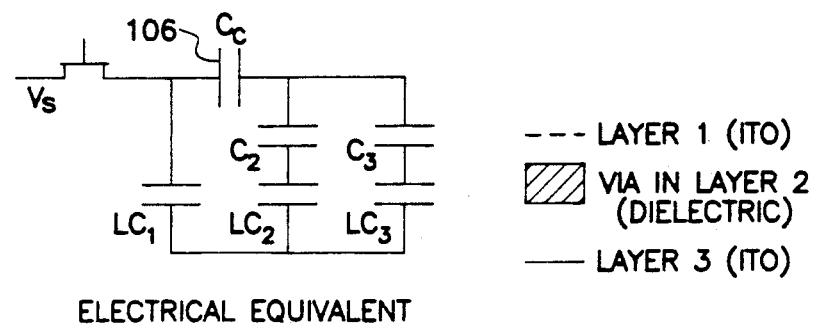

FIGS. 7a, 7b and 7c reveal another half-tone subpixel arrangement. FIG. 7a shows a halftone pixel 104 having three concentric subpixels 101, 102, and 103. FIG. 7b is a cross sectional view of the halftone pixel 104. FIG. 7c is a schematic of the electrical equivalent of pixel 104. It includes a coupling capacitor, $C_c$, 106. The role of coupling capacitor 106 is to provide additional flexibility in the choice of the dielectric materials used, and the thicknesses employed, in the fabrication of control capacitors $C_2$ and $C_3$.

Figure 8:
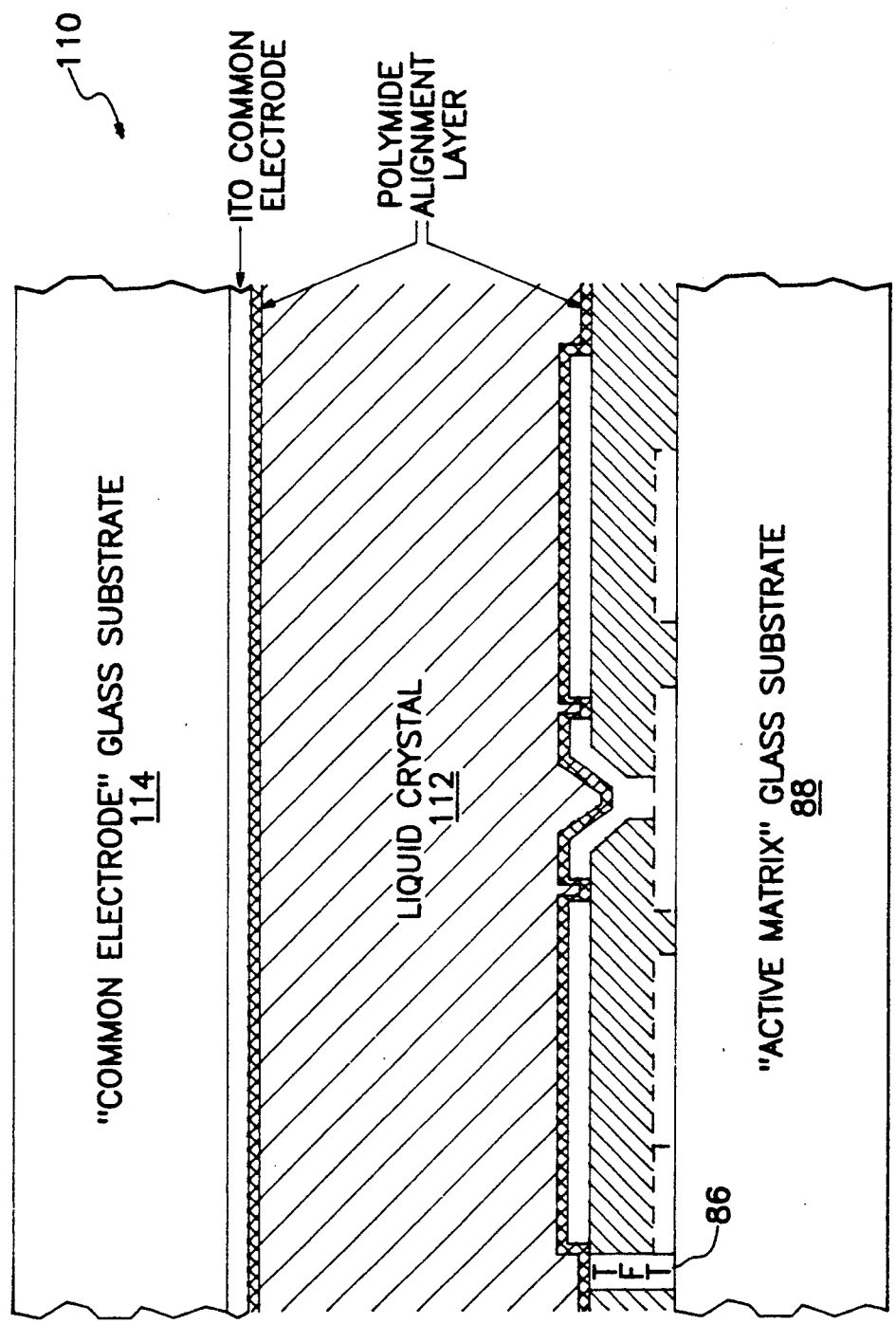
FIG. 8 illustrates a cross-section of a display incorporating the half tone pixel configuration of FIG. 5.

FIG. 8 shows the cross-section for a display employing the control capacitor design shown in FIGS. 5a–c Control capacitor array 84 is fabricated along with the TFT array 86 on the same substrate 88. The drain electrode of the TFT 86 is connected to first ITO electrode 81 defining the control capacitor areas of array 84. After active matrix substrate 88 with control capacitor array 84 is fabricated, display assembly 110 is fabricated by sandwiching liquid crystal 112 between active matrix substrate 88 and common electrode substrate 114, using conventional liquid crystal display assembly technologies.

I claim:

1. A grayscale liquid crystal display comprising a plurality of pixels having a high pixel aperture ratio, comprising a first substrate and a second substrate wherein each pixel further comprises:
   first, second, third, fourth and fifth subpixels;
   a first electrode located on said first substrate;
   a second electrode located on said first substrate;
   a third electrode located on said first substrate;
   a fourth electrode located on said first substrate;
   a fifth electrode situated between said first, second, third and fourth electrodes, respectively, and located on said first substrate;
   a dielectric layer situated on said at least first, second, third, fourth and fifth electrodes, said dielectric layer having a via proximate to said fifth electrode;
   a sixth electrode situated on said dielectric layer, proximate to said first electrode and defining said first subpixel;
   a seventh electrode situated on said dielectric layer, proximate to said second electrode and defining said second subpixel;
   an eighth electrode situated on said dielectric layer, proximate to said third electrode and defining said third subpixel;
   a ninth electrode situated on said dielectric layer, proximate to said fourth electrode and defining said fourth subpixel;
   a tenth electrode situated on said dielectric layer and connected through the via of said dielectric layer to said fifth electrode, and defining said fifth subpixel;
   a liquid crystal layer situated on said sixth, seventh, eighth, ninth and tenth electrodes;
   an eleventh electrode situated on said liquid crystal layer; and
   said second substrate supporting said eleventh electrode.

2. Display of claim 1 wherein said first, second, third, fourth and fifth electrodes are connected to one another.

3. Display of claim 2 further comprising a transistor connected to at least one of said first, second, third, fourth and fifth electrodes.

4. Display of claim 3 wherein:
   said first and sixth electrodes form a first control capacitance;
   said second and seventh electrodes form a second control capacitance;
   said third and eighth electrodes form a third control capacitance;
   said fourth and ninth electrodes form a fourth control capacitance;
   said eleventh electrode and sixth electrode form a first liquid crystal capacitance of said first subpixel;
   said eleventh electrode and seventh electrode form a second liquid crystal capacitance of said second subpixel;

said eleventh electrode and eighth electrode form a third liquid crystal capacitance of said third subpixel;

said eleventh electrode and ninth electrode form a fourth liquid crystal capacitance of said fourth subpixel; and said eleventh electrode and fifth electrode form a fifth liquid crystal capacitance.

5. A grayscale liquid crystal display, having a high pixel aperture ratio, comprising:

a matrix substrate having an approximately planar surface;

a plurality of pixels wherein each pixel comprises:

a plurality of primary subpixels wherein each primary subpixel comprises:

a first electrode situated on the planar surface of said matrix substrate;

a dielectric layer situated on said first electrode; and a second electrode situated on said dielectric layer such that said dielectric layer is situated between said first and second electrodes, and said second electrode defines and delineates an area of said primary subpixel; and at least one secondary subpixel comprising a first electrode situated on said matrix substrate, said first electrode defining and delineating an area of said secondary subpixel, and said secondary subpixel being situated in an area of said pixel not defined and delineated by said primary subpixels; and wherein:

said first electrodes of said primary subpixels of said pixel, are connected to one another;

said first electrode of said at least one secondary subpixel of said pixel is connected to at least one of said first electrodes of said primary subpixels of said pixel; and each of said first electrodes of said primary subpixels of said pixel has a surface area size different from surface area sizes of the other of said first electrodes of said primary subpixels of said pixel.

a common electrode substrate with a common electrode having an approximately planar surface proximate to said second electrodes of said primary and secondary subpixels of each of said plurality of pixels, and parallel to the planar surface of said matrix substrate; and a liquid crystal layer situated between said common electrode and said second electrodes of said primary and secondary subpixels of each of said plurality of pixels.

6. Display of claim 5 wherein:

said first and second electrodes of each primary subpixel has a control capacitance value proportional to the surface area size of said first electrode;

each primary subpixel of each pixel, is activated upon application of a particular voltage to the respective first electrode and said common electrode, the particular voltage having a value that exceeds the threshold voltage value of said primary subpixel so that said primary subpixel is activated, the threshold value of said primary subpixel being inversely proportional to the control capacitance value of said first and secondary electrodes of said primary subpixel; and said secondary subpixel of each pixel has a direct connection and is activated upon application of a particular voltage that exceeds the threshold voltage value of said secondary subpixel.

7. Display of claim 6 wherein said primary subpixels of each of said plurality of pixels, are concentric to the secondary subpixels.

8. Display of claim 7 further comprising a coupling capacitor wherein said coupling capacitor comprises:

a first electrode connected to said first electrode of at least one of said primary subpixels of each pixel; and a second electrode connected to said first electrode of said secondary subpixel of each respective pixel, and said first electrode of said secondary subpixel of each respective pixel is disconnected form said first electrodes of said primary subpixels of each respective pixel.

* * * * *

UNITED STATES PATENT AND TRADEMARK OFFICE
CERTIFICATE OF CORRECTION

PATENT NO. : 5,126,865
DATED : June 30, 1992
INVENTOR(S) : Kalluri R. Sarma

It is certified that error appears in the above-identified patent and that said Letters Patent is hereby corrected as shown below:

Column 6, line 15 delete "," after pixel

Column 6, line 30 delete "," after pixels

Column 6, line 40 delete "form" and insert --from--

Signed and Sealed this

Nineteenth Day of October, 1993

Attest:

BRUCE LEHMAN

Attesting Officer

Commissioner of Patents and Trademarks